(12) United States Patent
Kojima

(10) Patent No.: US 9,025,183 B2
(45) Date of Patent: May 5, 2015

(54) IMAGE FORMING APPARATUS, METHOD FOR CONTROLLING IMAGE FORMING APPARATUS, AND STORAGE MEDIUM FOR PERFORMING MAINTENANCE ON AN IMAGE FORMING APPARATUS

(71) Applicant: Canon Kabushiki Kaisha, Tokyo (JP)

(72) Inventor: Nobuyuki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/748,348

(22) Filed: Jan. 23, 2013

(65) Prior Publication Data
US 2013/0194629 A1    Aug. 1, 2013

(30) Foreign Application Priority Data
Feb. 1, 2012   (JP) ................. 2012-019897

(51) Int. Cl.
*G06F 15/00* (2006.01)
*H04N 1/00* (2006.01)
(52) U.S. Cl.
CPC ........ *H04N 1/00413* (2013.01); *H04N 1/00416* (2013.01); *H04N 2201/0094* (2013.01)

(58) Field of Classification Search
USPC ...................................... 358/1.15
See application file for complete search history.

(56) References Cited

U.S. PATENT DOCUMENTS

2004/0046984 A1* 3/2004 Azami et al. ............ 358/1.13

FOREIGN PATENT DOCUMENTS

JP         2003-114779 A        4/2003

* cited by examiner

*Primary Examiner* — Saeid Ebrahimi Dehkordy
(74) *Attorney, Agent, or Firm* — Canon USA, Inc., IP Division

(57) ABSTRACT

An image forming apparatus configured to display a maintenance item for a user to do maintenance includes an input unit configured to input code information for specifying a plurality of maintenance items to be displayed by the image forming apparatus, a specifying unit configured to specify the plurality of maintenance items to be displayed by the image forming apparatus out of all the maintenance items based on the code information input by the input unit, a generation unit configured to generate a screen for displaying the plurality of maintenance items specified by the specifying unit on the same screen, and a display unit configured to display the screen generated by the generation unit.

9 Claims, 12 Drawing Sheets

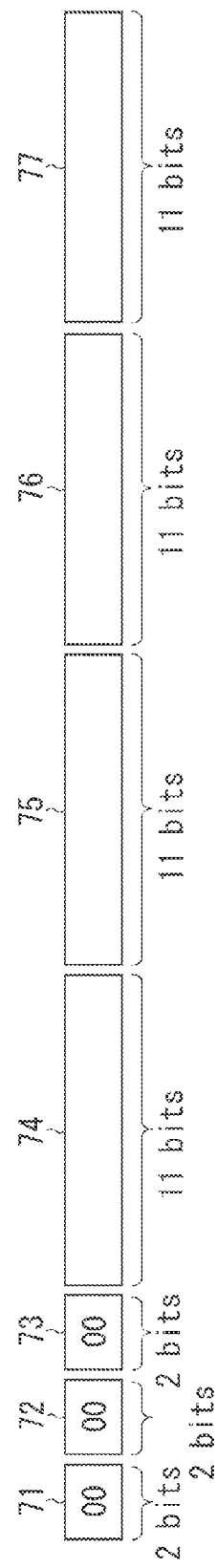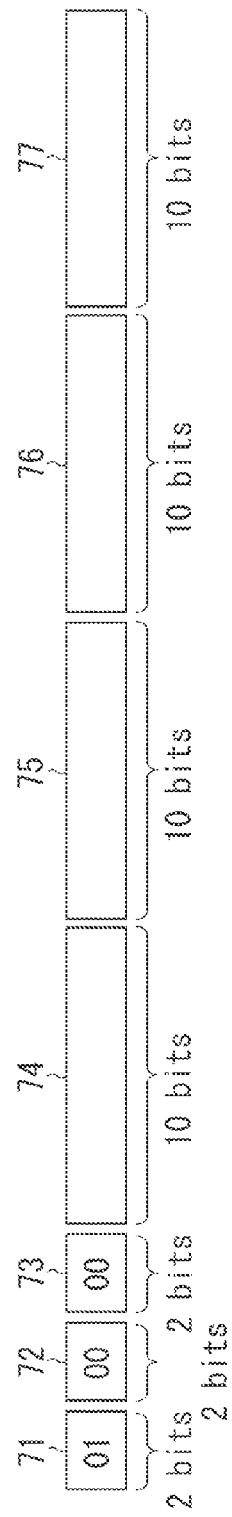

FIG. 8

| CODE NUMBER | ITEM (EXAMPLE) |
|---|---|
| CODE(8 bits) | |
| 1(00000001) | <2>COPIER>ADJUST>OPTION>TMPTBL1 |
| ... | <2>COPIER>ADJUST>OPTION>TMPTBL2 |
| ... | <1>FEEDER>OPTION>FEEDSNS>SENSPWR |
| ... | ... |
| 255(11111111) | ... |

| CODE(9 bits) | ITEM |
|---|---|
| 256(100000000) | <1>FEEDER>OPTION>SENSOR>SENSOR_1 |
| ... | ... |
| ... | ... |
| ... | ... |
| 511(111111111) | ... |

| CODE(10 bits) | ITEM |
|---|---|
| 512(1000000000) | <2>COPIER>ADJUST>DENS>VCONT2 |
| ... | ... |
| ... | ... |
| ... | ... |
| 1023(1111111111) | ... |

| CODE(11 bits) | ITEM |
|---|---|
| 1024(10000000000) | <3>COPIER>DISPLAY>VERSION>ABC1 |
| ... | <3>FEEDER>DISPLAY>VERSION>OPTROM |
| ... | ... |
| ... | ... |
| 2047(11111111111) | ... |

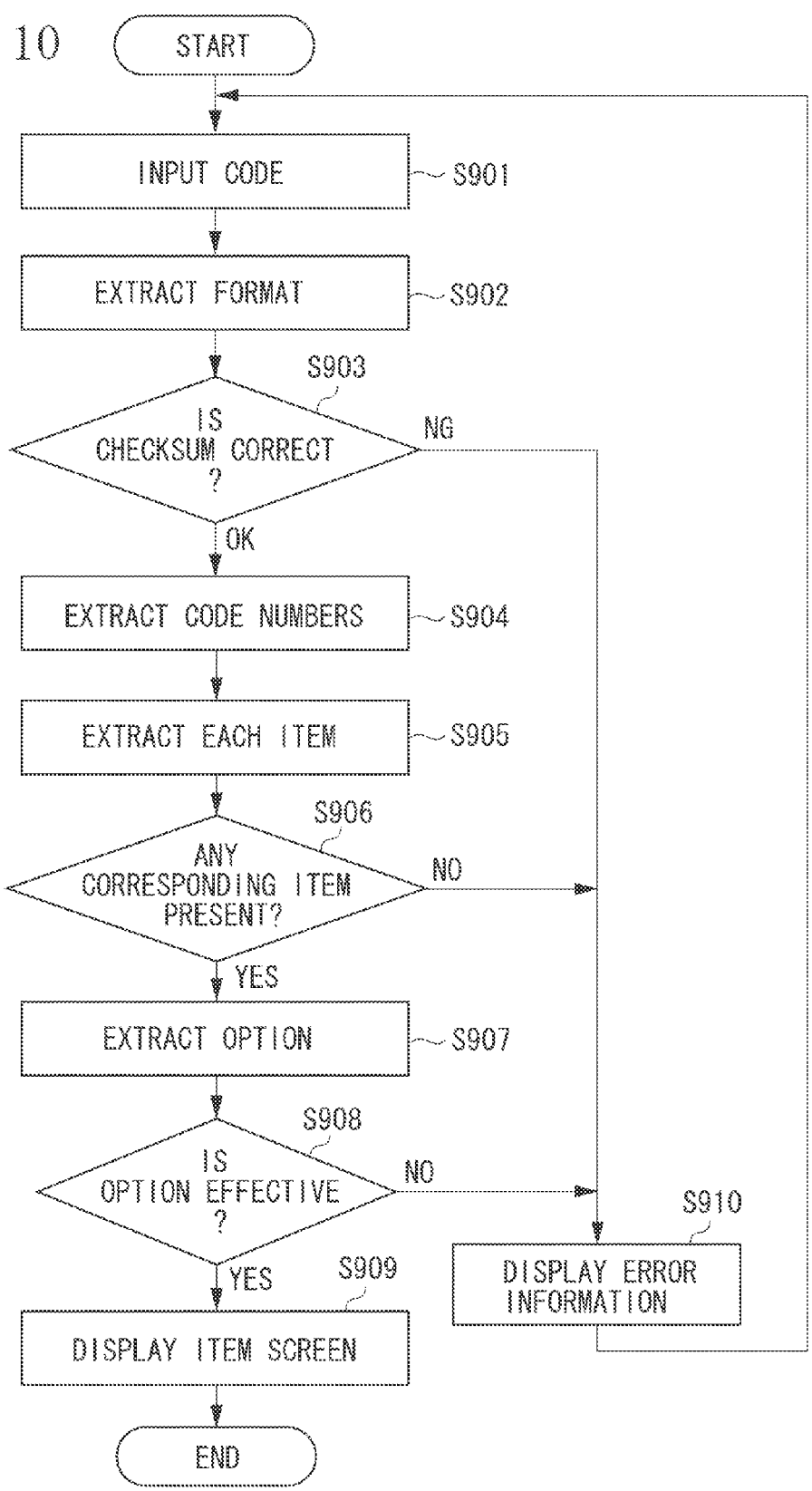

IMAGE FORMING APPARATUS, METHOD FOR CONTROLLING IMAGE FORMING APPARATUS, AND STORAGE MEDIUM FOR PERFORMING MAINTENANCE ON AN IMAGE FORMING APPARATUS

BACKGROUND OF THE INVENTION

1. Field of the Invention

The present invent relates to maintenance of an image forming apparatus.

2. Description of the Related Art

To stably operate an image forming apparatus, a maintenance engineer periodically visits a customer destination to do maintenance. In the case, the maintenance engineer confirms a value of a counter for measuring the number of times of operation and various types of information of a sensor installed in the image forming apparatus using an interface for service maintenance. The maintenance engineer determines an internal state of the image forming apparatus and deteriorated states of components based on the confirmed information, and sets a most suitable adjustment value and executes an adjustment operation via the interface, to perform adjustment so that the image forming apparatus normally operates.

A content of the maintenance at the customer destination by the maintenance engineer is reported to a development company. The development company totalizes these reports, and examines adjustment means specific to a model and a method for coping with a specific case. As a result, service maintenance information is updated, is opened in a service manual and a website, and is provided to the maintenance engineer. This is repeated to always update information about a coping method most suitable for a case so that the maintenance engineer can optimally cope with the case at the customer destination.

When a case of a malfunction occurs, for example, the maintenance engineer checks the service manual and the website to confirm a method for coping with the malfunction. There is software-based coping such as resetting of an adjustment value in addition to hardware-based coping such as component replacement and mechanical adjustment depending on a content of the malfunction. In the software-based coping, the serviceman refers to a plurality of sensor values and counter values via the interface for service maintenance, and sets the most suitable adjustment value in view of the values.

For such maintenance, a technique for inputting a search key to display a maintenance item corresponding to the search key has been discussed (Japanese Patent Application Laid-Open No. 2003-114779).

In recent years, the image forming apparatus has been multifunctionalized, so that optional devices, such as a paper feed deck, a feeder, and a sorter, have been incorporated thereinto. Thus, the respective numbers of sensors and counters in the imaging apparatus and the optional devices may be increased to a total of 1000 or more. The number of maintenance items for confirming or adjusting values of the sensors and the counters are also increased.

Generally, a user needs to confirm a plurality of maintenance items and derive the most suitable adjustment value to do maintenance. More specifically, the user needs to perform work for specifying desired one of an enormous number of maintenance items for all of the plurality of maintenance items to be confirmed when doing maintenance. Even if the technique discussed in Japanese Patent Application Laid-Open No. 2003-114779 is used, it takes time and labor for the user to frequently input the search key.

SUMMARY OF THE INVENTION

The present invention is directed to a mechanism capable of avoiding inconvenience of frequently switching screens when maintenance required to confirm a plurality of maintenance items is done.

According to an aspect of the present invention, an image forming apparatus configured to display a maintenance item for a user to do maintenance includes an input unit configured to input code information for specifying a plurality of maintenance items to be displayed by the image forming apparatus, a specifying unit configured to specify the plurality of maintenance items to be displayed by the image forming apparatus out of all the maintenance items based on the code information input by the input unit, a generation unit configured to generate a screen for displaying the plurality of maintenance items specified by the specifying unit on the same screen, and a display unit configured to display the screen generated by the generation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 7A, 7B, 7C, and 7D each illustrate an example of a structure of a code indicating items for service maintenance provided to the image forming apparatus according to the first exemplary embodiment.

FIG. 8 illustrates an example of a correspondence table between items for service maintenance and code numbers assigned to the items.

FIG. 10 is a flowchart illustrating an example of processing for the image forming apparatus according to the second exemplary embodiment to display an item screen for a maintenance mode based on an input code.

DESCRIPTION OF THE EMBODIMENTS

Various exemplary embodiments, features, and aspects of the invention will be described in detail below with reference to the drawings.

Figure 1:
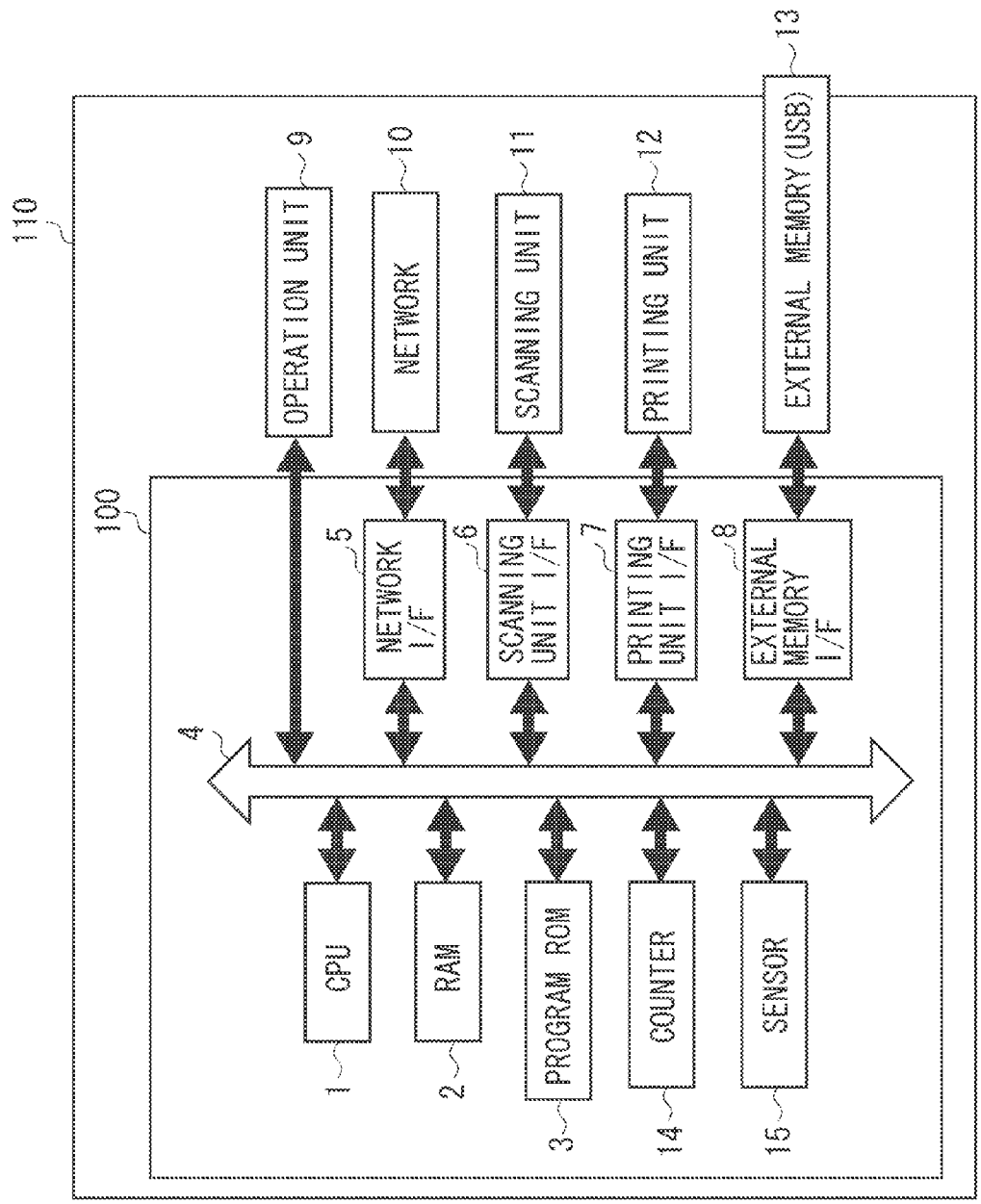
FIG. 1 is a block diagram illustrating an example of a configuration of an image forming apparatus according to a first exemplary embodiment of the present invention.

A first exemplary embodiment of the present invention will be described below. FIG. 1 is a block diagram illustrating an example of a configuration of an image forming apparatus according to the first exemplary embodiment. In FIG. 1, a control block 100 in an image forming apparatus 110 controls the entire image forming apparatus 110. In the control block 100, a central processing unit (CPU) 1 reads out and executes a program, which has been computer-readably recorded on a program read-only memory (ROM) 3, and controls each of the devices in the image forming apparatus 110 via a system bus 4. The CPU 1, a random access memory (RAM) 2, the program ROM 3, a network interface (I/F) 5, a scanning unit I/F 6, a printing unit I/F 7, an external memory I/F 8, an operation unit 9, a counter 14, a sensor 15, and others are connected to the system bus 4.

The program ROM 3 stores various types of data in addition to the program to be executed by the CPU 1. The RAM 2 is used as a work area of the CPU 1. The network I/F 5 is an interface for connection to an external network environment 10, such as Ethernet. The scanning unit I/F 6 communicates with a scanning unit 11. The printing unit I/F 7 communicates with a printing unit (a printer engine) 12 that performs printing.

The external memory I/F 8 is an interface for connection to an external memory 13 such as a universal serial bus (USB) flash drive. The operation unit 9 has a function of displaying various types of information and accepting input from a user. The sensor 15 includes a plurality of sensors, and detects various states of the image forming apparatus 110. The counter 14 stores the number of times of various operations.

The CPU 1 outputs an image signal serving as output information to the printing unit (the printer engine) 12 via the printing unit I/F 7 based on the control program stored in the program ROM 3. The CPU 1 similarly receives an image signal from the scanning unit 11 via the scanning unit I/F 6. The CPU 1 receives sensor information from various sensors 15 under controller management. The CPU 1 performs control to manage and store a value counted up by measuring the number of times of operations in the counter 14.

The scanning unit 11 and the printing unit 12 respectively store the sensor information and the counter 14, which is not illustrated, and the CPU 1 can acquire their respective values via the scanning unit I/F 6 and the printing unit I/F 7.

Figure 2:
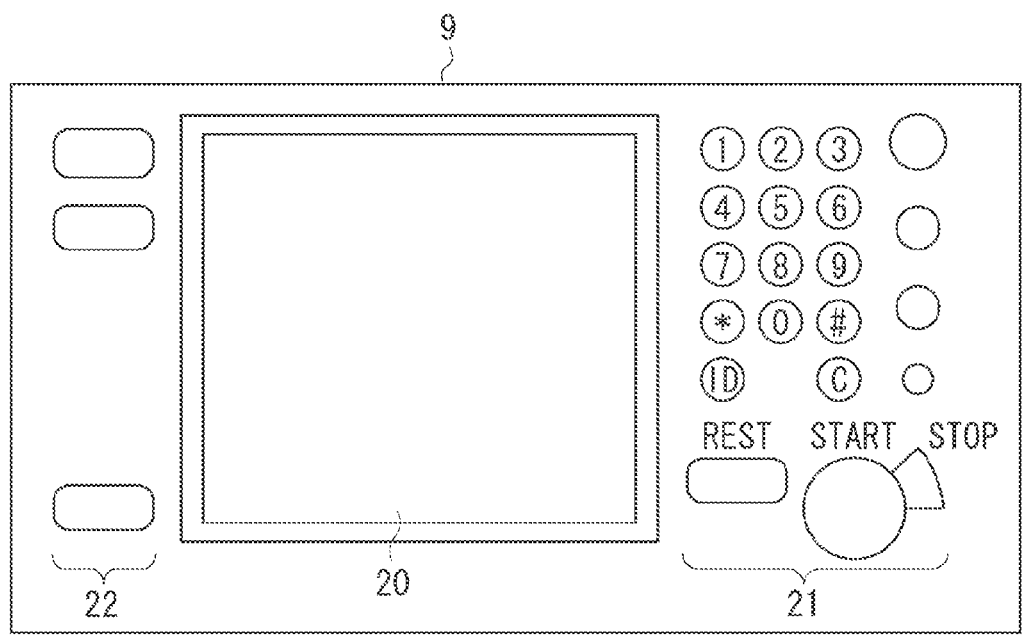
FIG. 2 illustrates an operation unit in the image forming apparatus illustrated in FIG. 1.

The CPU 1 executes information display on a display unit in the operation unit 9 and behavior of the display, which will be described below, according to the program stored in the program ROM 3. FIG. 2 illustrates the operation unit 9 in the image forming apparatus 110 illustrated in FIG. 1. As illustrated in FIG. 2, the operation unit 9 includes a display unit 20 with a touch panel, various types of control keys (collectively referred to as a control key 21) including a numeric keypad, and special keys (collectively referred to as a special key 22) for switching a content to be displayed on the display unit 20.

The display in the present exemplary embodiment, described below, is performed on the display unit 20, and input to the display is executed with a touch on the display unit 20 or the control key 21. An interface for service maintenance will be described below with reference to FIGS. 3A and 3B and FIG. 4. The content to be displayed on the display unit 20 in the operation unit 9 is changed for each function used by the image forming apparatus 110.

Figure 3A:
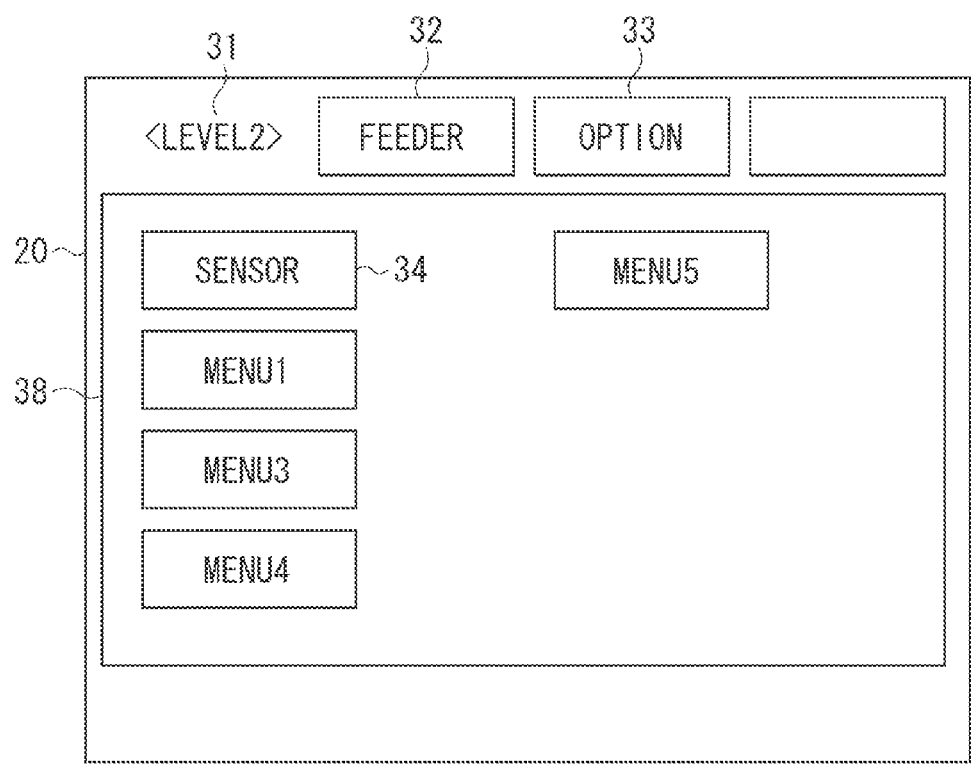
FIGS. 3A and 3B each illustrate an example of display of a screen for normal service maintenance used by a maintenance engineer.
Figure 3B:
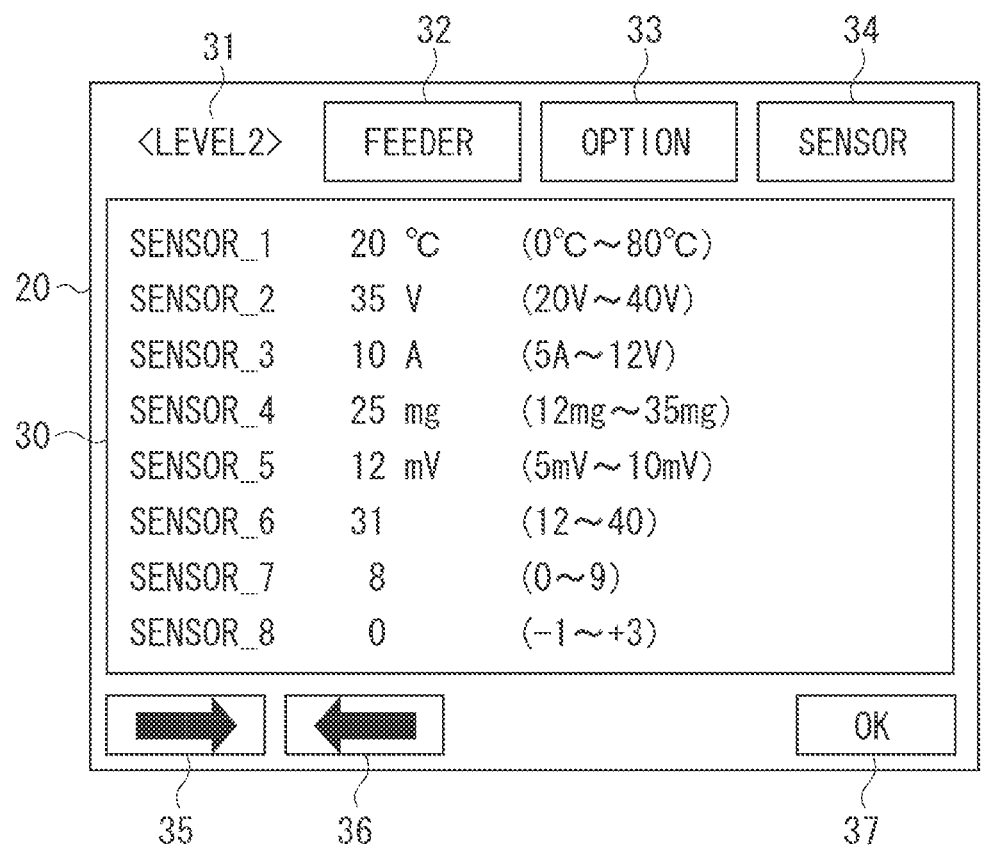

FIGS. 3A and 3B illustrate examples of display on a screen for normal service maintenance used by a maintenance engineer. The screen for normal service maintenance is not opened to a customer user, and can be used only by the maintenance engineer. The screen for normal service maintenance has conventionally been provided in the image forming apparatus 110.

Figure 4:
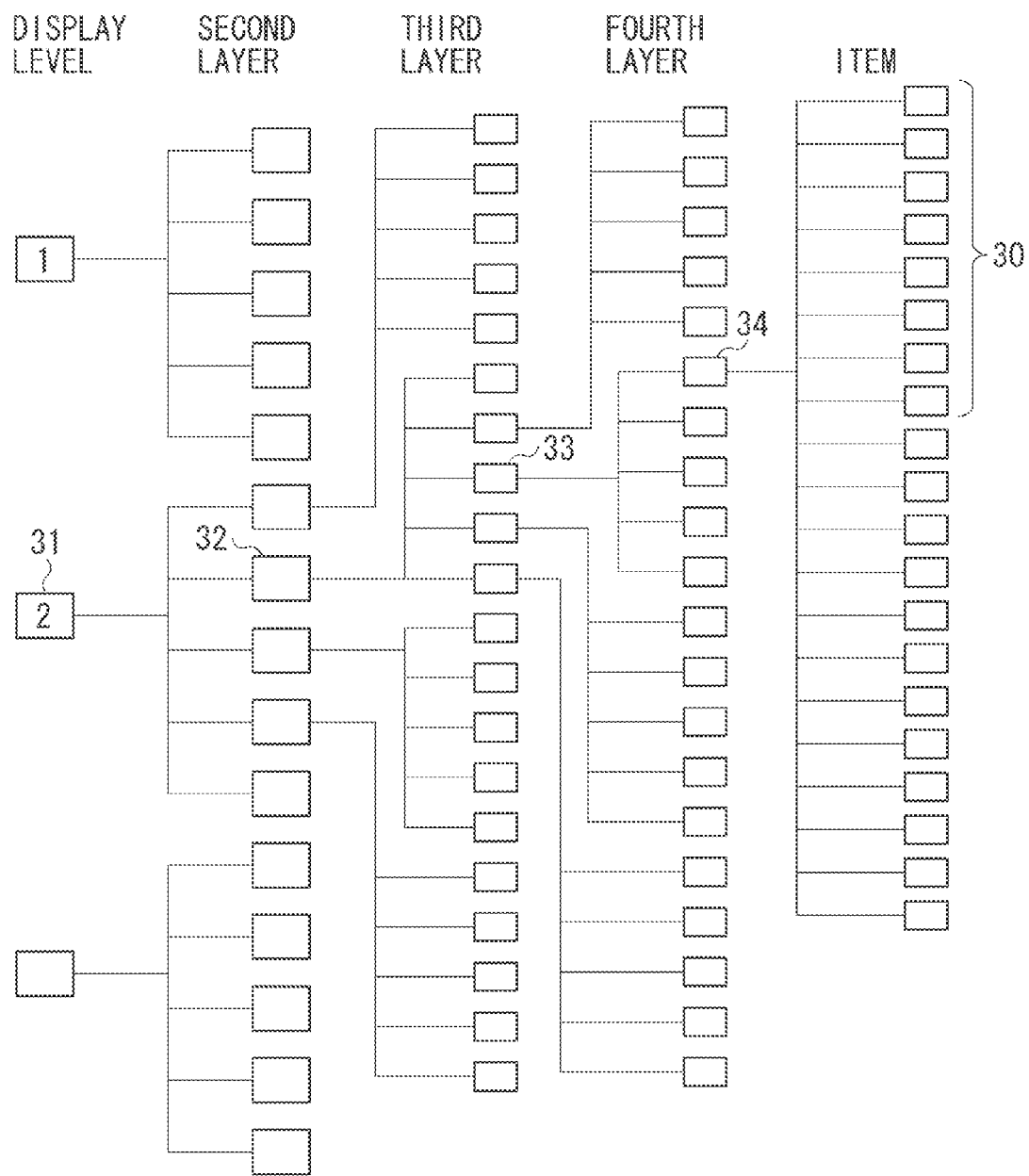
FIG. 4 illustrates an example of a tree structure of a menu including items for service maintenance.

FIG. 4 illustrates an example of a tree structure of a menu including items for service maintenance. The items for service maintenance are positioned in a final node of the menu having the tree structure (the display level>the second layer>the third layer>the fourth layer>the items in the example illustrated in FIG. 4). In the items for service maintenance, settings of version information, various types of sensor information, counter information, and an adjustment value, and a state of a switch for an operation change can be displayed, and their setting values can be changed.

As illustrated in FIG. 4, out of the layers in the tree structure, the highest layer (a first layer) is classified as the "display level". The display level indicates the levels of layers and items below the first layer in the tree structure. The levels include a level used only for confirmation during normal maintenance work, a level used when setting is changed during normal maintenance work, and a level used only in a significantly special case.

The second layer is classified by parts (the controller block 100, the printing unit 12, the scanning unit 11, and a feeder, etc.) of the image forming apparatus 110. The third layer is classified by functions of the parts in the second layer. For example, the third layer below the second layer (the printing unit 12) is classified by a function of switching operation modes, an adjusting function, and component levels (a fixing unit, a feeding unit, and an image forming unit) in the part. The fourth layer changes depending on the meaning of the third layer above the fourth layer. The layer below the fourth layer is the final layer in the tree structure, and indicates individual items.

FIG. 3A illustrates an example of display in a halfway stage before the tree is followed up to the item. In the example, "LEVEL2" (31), "FEEDER" (32), and "OPTION" (33) are respectively selected in the display level, the second layer, and the third layer. In the highest stage of the display unit 20, the selected layers are displayed as "LEVEL2>FEEDER>OPTION". In a display area 38, node names (SENSOR, MENU1, MENU3, MENU4, and MENU5) in the fourth layer existing below a node ("OPTION" (33) illustrated in FIG. 4) (LEVEL2>FEEDER>OPTION) are displayed as the menu in the display area 38.

FIG. 3B illustrates display when the maintenance engineer selects the "SENSOR" (34) as the menu in FIG. 3A to have reached the final layer. The final node indicates items. Therefore, a value managed by each of the items is displayed.

In the example illustrated in FIG. 3B, eight items (SENSOR_1, SENSOR_2, ..., SENSOR_8) out of 20 items below "SENSOR" (34) in the fourth layer are displayed in the display area 30.

The number of items that can be displayed is limited by the limitation of the screen size of the display unit 20. Therefore, a maximum of eight items are simultaneously displayed. However, items to be respectively displayed using a left button (35) and a right button (36) can be switched, i.e., scrolled.

As apparent from the example of the display illustrated in FIG. 3B, the items that can be simultaneously displayed are only items that are included in the same final node and within the same scroll range. In coping with a certain malfunction or a case required to be adjusted, the maintenance engineer at the site examines the manual and the website, to obtain information about the coping method. For example, a database of cases indicating the coping method is operated in the website, so that the maintenance engineer can input and examine the case required to be adjusted.

The coping method includes a method for checking the current state of an image forming apparatus based on a sensor value to change an adjustment value according to the sensor value. More specifically, a voltage value of a specific component or a table of a potential map for each temperature is changed based on a temperature and a humidity inside the image forming apparatus. In the manual and the website, an instruction to confirm the items and change their setting is placed.

Figure 5:
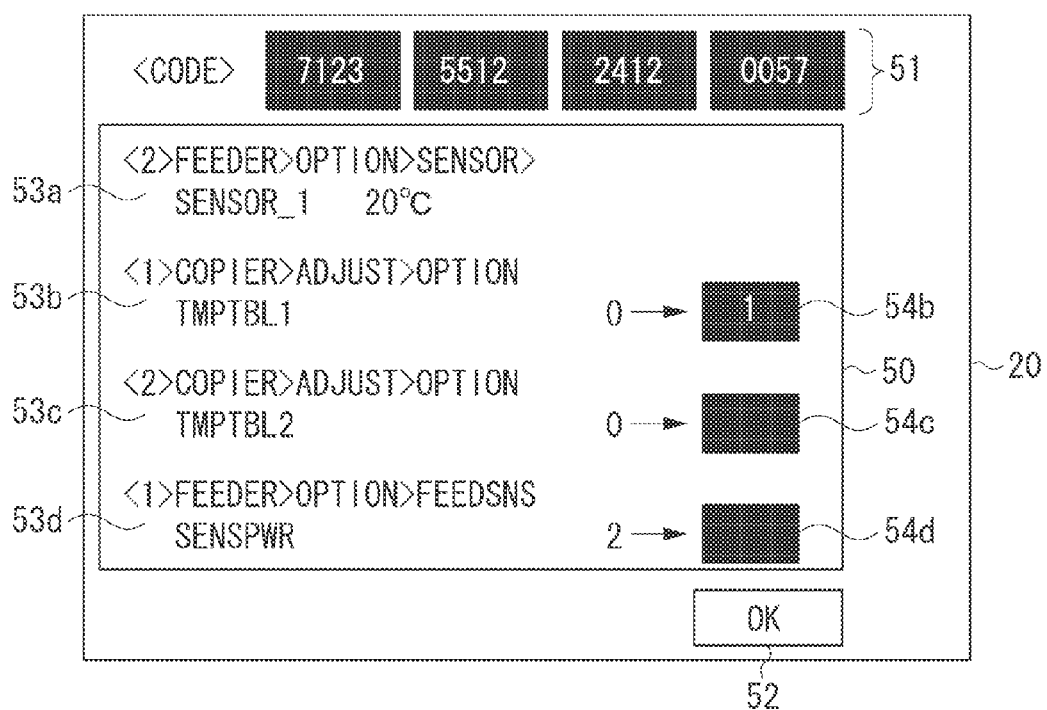
FIG. 5 illustrates an example of display of a screen for service maintenance according to the first exemplary embodiment.

FIG. 5 illustrates an example of display of a screen for service maintenance according to the present exemplary embodiment. FIG. 5 illustrates an example in which items for performing information display and adjustment value setting required to cope with a specific malfunction respectively belong to entirely different nodes in the tree structure. For example, information display and adjustment value setting may be required for an item "SENSOR_1" belonging to the display level "2">the second layer "FEEDER">the third layer "OPTION">the fourth layer "SENSOR", an item. "TMPTBL1" belonging to the display level "1">the second layer "COPIER">the third layer "ADJUST">the fourth layer "OPTION", an item "TMPTBL2" belonging to the display level "2">the second layer "COPIER">the third layer "ADJUST">the fourth layer "OPTION", and an item "SENSPWR" belonging to the display level "1">the second layer "FEEDER">the third layer "OPTION">the fourth layer "FEEDSNS".

Thus, information display and adjustment value setting for the four items respectively belonging to the entirely different nodes in the tree structure may be required to cope with a specific malfunction. In interfaces for service maintenance as illustrated in FIGS. 3A and 3B, the user needs to frequency access required items by following the menu having the tree structure for each of the required items, which is significantly inconvenient because it takes a lot of time and labor to perform an operation, and work for comparing displayed values cannot be performed.

If interfaces for performing information display and adjustment value setting for a plurality of items required to cope with the above-described malfunction can be displayed on the same screen, therefore, the above-described problem can be solved. For example, an interface as illustrated in FIG. 5 is used, so that values of a plurality of items required to cope with the malfunction may be compared and confirmed, like in information 53a to 53d, to be set. If setting the items, a serviceman may select the item to be adjusted by touching one of information 54b to 54d, and can set the item to be adjusted by inputting an adjustment value for the item from the control key 21.

Cases required to be adjusted in a general image forming apparatus and items required to be adjusted, which have occurred in a past model and a model of the same group, may be previously stocked. A program for service maintenance is upgraded, so that content thereof may also be updated. The program for service maintenance may be upgraded using the same means as a mechanism for upgrading the program for the image forming apparatus because the program for service maintenance is included in the program for the image forming apparatus. The means includes a method for downloading the program using a dedicated tool by connecting the image forming apparatus and a personal computer in a peer-to-peer fashion, a method for downloading the program from a download site via a network by the image forming apparatus, and a method for downloading the program using an external memory such as a USB flash drive.

However, even in this method, the items in any combination, which are not incorporated into the program from the beginning, cannot be collectively displayed. As the operation of the image forming apparatus progresses at a customer destination in a market, as described above, a new problem occurs, and more improved measures are found out. Every time the problem occurs or more improved measures are found out, the program may be coped with by upgrading the program for the image forming apparatus, which is not realistic because man-hours are additionally required to cope with the problem.

Display of a screen having measures accumulated therein can desirably be performed without changing the program in a new combination. Therefore, a development company places a code including 8 to 16 digit sequences described below, when a new case required to be adjusted and measures therefor are added to an addendum of the manual and the website as information about measures.

The maintenance engineer searches the addendum of the manual and the website for the case required to be adjusted to acquire the placed code together with information about coping means. A function of enabling input of code information to a service maintenance screen of the image forming apparatus 110 (a code input portion 51 illustrated in FIG. 5) is prepared, and the CPU 1 accepts code input from the maintenance engineer via the operation unit 9. If inputting the code information, the serviceman selects the code by touching the code input portion 51, and inputs the code from the numeric keypad of the control key 21. The image forming apparatus 110 extracts data indicating items for measures from the code input from the code input portion 51, reconstructs the required items, and displays the reconstructed items on the service maintenance screen (FIG. 5). More specifically, the CPU 1 specifies, out of all the maintenance items, the plurality of maintenance items to be displayed by the image forming apparatus 110 based on the code information input from the operation unit 9, generates a screen for displaying the specified plurality of maintenance items on the same screen, and displays the generated screen 50 illustrated in FIG. 5.

A code structure will be described below with reference to FIGS. 7A, 7B, 7C, and 7D and FIG. 8. FIGS. 7A, 7B, 7C, and 7D illustrate respective examples of a structure of a code indicating items for service maintenance provided in the image forming apparatus 110 according to the first exemplary embodiment. As illustrated in FIGS. 7A, 7B, 7C, and 7D, two bits at the head of the code correspond to a format bit 71 indicating each of four types of formats.

The subsequent two bits correspond to a data number bit 72 indicating the number of data portions to be designated in the code. Further, the subsequent two bits correspond to a checksum bit 73. The checksum bit 73 includes determination information for determining whether the code is effective by determining the presence or absence of an error in the code.

Further, the subsequent data portions 74 to 77 differ in bit lengths depending on the format bit 71. The respective data portions 74 to 77 store code numbers assigned to the items for service maintenance, as illustrated in a table in FIG. 8. The number of data portions is not limited to four. More specifically, a code to be input to the code input portion 51 to cope with a specific malfunction includes one or more code numbers assigned to the items for service maintenance provided in the image forming apparatus 110.

FIG. 8 illustrates an example of a correspondence table of items for service maintenance and code numbers assigned to the items. More specifically, FIG. 8 illustrates correspondence information between code numbers stored in the respective data portions 74 to 77 illustrated in FIGS. 7A, 7B, 7C, and 7D and the items for service maintenance. Data corresponding to the correspondence table illustrated in FIG. 8 is stored in the program ROM 3 in the image forming apparatus 110.

While a large number of, e.g., 2000, items for service maintenance exist, items to be actually used for adjustment maintenance are limited to some extent. For example, version information, an operation mode of a function, and a setting value used only to display a screen are not used in a screen for coping with a specific case (FIG. 5), and, therefore, may not be included in a code. Large values are assigned to the respective items that are not used in the screen for coping with a specific case (FIG. 5), and small values are assigned to the respective items having relatively high frequencies of use. When only the item having the highest frequency of use is included in the code for coping with a specific malfunction input from the code input portion 51, therefore, all the data portions 74, 75, 76, and 77 may be eight bits in length, as illustrated in FIG. 7A, so that the entire bit size of the code may be reduced.

As illustrated in FIG. 8, the items are assigned in use frequency order in a step-by-step manner. When a code is generated, a format is determined to match the item assigned the maximum number of bits out of the plurality of items included in the code. If only items having high frequencies of use are included in the code, therefore, the number of digits of the code may fall within 11 or less. The number of digits of the code is not limited to 11 or less, and can be changed in design depending on the number of items for service maintenance provided in the image forming apparatus 110.

Figure 6:
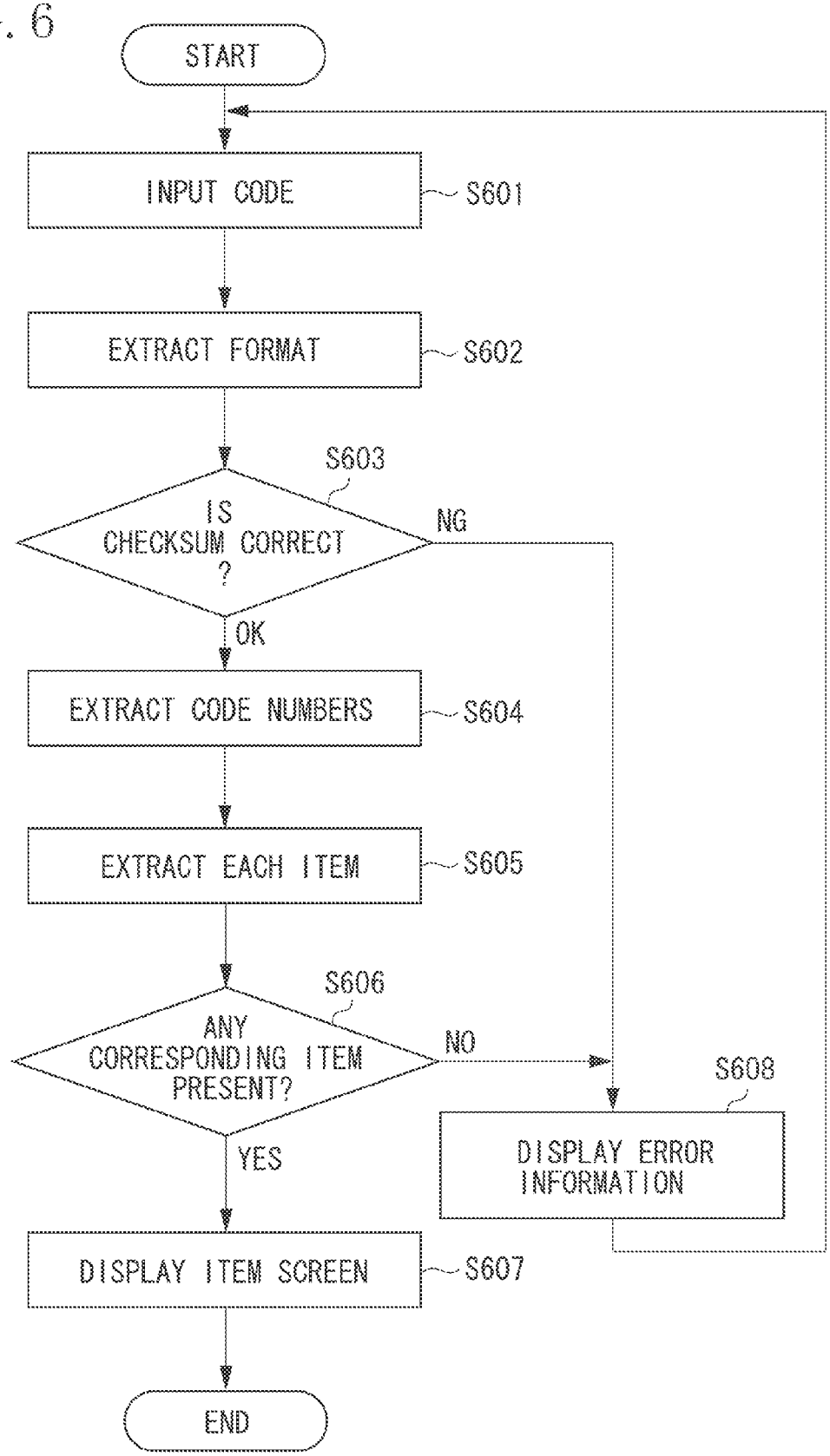
FIG. 6 is a flowchart illustrating an example of processing for the image forming apparatus according to the first exemplary embodiment to display an item screen for a maintenance mode based on an input code.
Figure 7C:
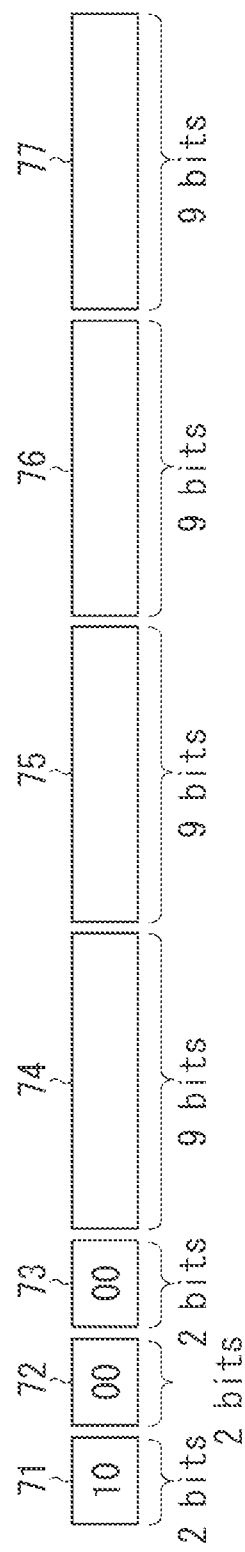
Figure 7D:
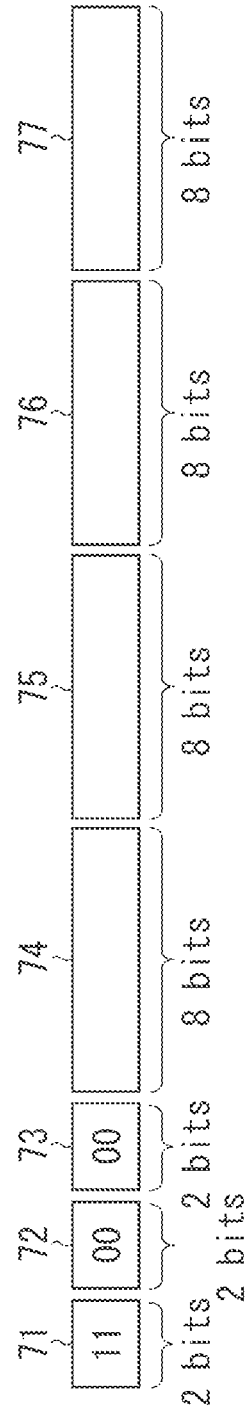

Logic of the image forming apparatus 110 according to the first exemplary embodiment to analyze an input code and display the screen 50 will be described below with reference to a flowchart illustrated in FIG. 6. FIG. 6 is a flowchart illustrating an example of processing for the image forming apparatus 110 to display an item screen for a maintenance mode based on the input code. Each of steps in the flowchart is implemented when the CPU 1 in the image forming apparatus 110 reads out and executes a program that is computer-readably recorded in the program ROM 3.

In step S601, when the maintenance engineer touches the code input portion 51, the CPU 1 first accepts input of a code from a numeric keypad of the control key 21. Then, when the maintenance engineer inputs the code with the numeric keypad, the CPU 1 detects the input to acquire the code input from the numeric keypad. In the present exemplary embodiment, the code includes a decimal number that can be input from the numeric keypad. However, the code is not limited to only a number. A character string, which can be input using a soft keyboard and a USB-connected hard keyboard, may also be used.

Then in step S602, the CPU 1 acquires the format bit 71 from the code that has been acquired in step S601. Then in step S603, the CPU 1 acquires the checksum bit 73 from the code that has been acquired in step S601, and determines whether a checksum of the numbers of bits assigned to the respective data portions 74 to 77 is correct. In a method for determining the checksum, the checksum is adjusted so that ones digit is even when the code excluding the format bit 71 and the data number bit 72 is indicated in bit notation, for example, to check whether the code has been input in error. The checksum may be adjusted so that ones digit is even when the input code is directly indicated in bit notation, to check whether the code has been input in error.

If it is determined that the checksum is not correct (NO in step S603), the CPU 1 determines that the code, which has been acquired in step S601, is not effective but is in error (NG), and the processing proceeds to step S608. In step S608, the CPU 1 displays error information (error information indicating that there is an error in the input code) on the display unit 20 in the operation unit 9, and the processing proceeds to step S601. In step S601, the CPU 1 waits until a code is input again.

On the other hand, if it is determined that the checksum is correct (YES in step S603), the CPU 1 determines that the code, which has been acquired in step S601, is effective (OK). Then, the processing proceeds to step S604.

In step S604, the CPU 1 acquires the number of data from the data number bit 72 in the code that has been acquired in step S601, and extracts code numbers corresponding to the number of data from the data portion 74 to the data portion 77 in the code. As described above, the data portions 74 to 77 differ in bit size depending on the format bit 71, so that the code numbers assigned to the items corresponding to the number of data indicated by the data number bit 72 can be extracted from the data portions 74 to 77 in the bit size.

Then in step S605, the CPU 1 extracts each of the items from the code numbers assigned to the items that have been extracted in step S604 using the code table (FIG. 8) stored in the program ROM 3. Then in step S606, the CPU 1 determines whether all the items corresponding to the code numbers have been extracted (have been included in the code table) in the extraction processing of step S605. If the CPU 1 determines that the item corresponding to one of the code numbers has not been extracted from the code table (has not been included in the code table) in the extraction processing of step S605 (NO in step S606), the processing proceeds to step S608. In step S608, the CPU 1 displays error information on the display unit 20 in the operation unit 9, and the processing proceeds to step S601. In step S601, the CPU 1 performs control to wait until a code is input again.

On the other hand, if the CPU 1 determines that all the items corresponding to the code numbers have been extracted from the code table (have been included in the code table) in the extraction processing in step S605 (YES in step S606), the processing proceeds to step S607.

In step S607, the CPU 1 performs control to dynamically generate and display the screen 50 for displaying information about the items (e.g., the information 53a to 53d illustrated in FIG. 5) extracted from the code table in step S605. The CPU 1 then performs control to accept setting of an adjustment value for each of the displayed items from the screen 50. Specifically, when detecting that one of the information 54b to 54d has been touched, the CPU 1 performs control to accept input of the adjustment value for the item from the control key 21. When detecting that the adjustment value for the item has been input from the control key 21 and an OK button 52 has been touched, the CPU 1 performs control to set the input adjustment value to the item.

With the foregoing processing, in the service maintenance provided to the image forming apparatus 110, the interface having items required to cope with the newest case collected therein may be dynamically constructed and provided even for the plurality of items that have been distributed in a deep layer structure. Thus, man-hours required for the serviceman to access the required items may be significantly reduced.

Even if the newest information is updated for the service maintenance, an interface, on which the newest information has been reflected, may be provided by only inputting a simple code, like in the code input portion 51 illustrated in FIG. 5, without installing a new program on the image forming apparatus 110 or updating the current program. Thus, the service maintenance can be done without depending on the environment (e.g., the network policy) at an installation destination of the image forming apparatus 110.

Further, it may be checked whether the user has input the code in error by including the checksum bit 73 in the code.

The interface for accessing each of the items for service maintenance, which have been conventionally provided, as illustrated in FIGS. 3A and 3B, is categorized by each feature of the item, and is not suitable for efficient work because the items required to cope with the case are scattered. The program for the image forming apparatus 110 may be corrected and coped with by providing a dedicated screen. To reflect the newest maintenance information, however, the image forming apparatus 110 may be difficult in operation to update the program every time the maintenance information is reflected. However, in the above-mentioned configuration, the screen having items required to cope with the newest case collected therein (e.g., the screen 50 illustrated in FIG. 5) may be dynamically generated and provided by code input (e.g., the code input portion 51 illustrated in FIG. 5) without updating the program for the image forming apparatus 110. Therefore, the above-described problem may be solved.

A second exemplary embodiment will be described below. In the above-described first exemplary embodiment, a configuration in which a code includes information about an item included in the code and checksum information for ensuring the certainty of a code number has been described. In the second exemplary embodiment, additional information for confirming whether an image forming apparatus to which a code has been input is a target model of the code is added to the code as determination information for determining whether the code is effective.

Figure 9:
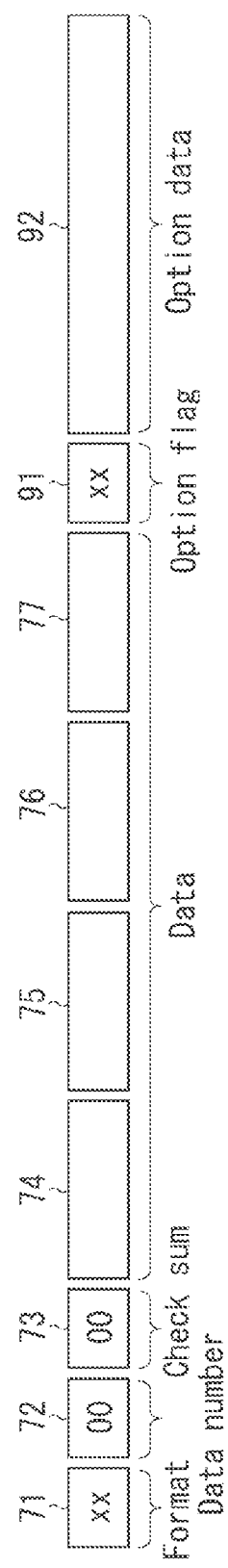
FIG. 9 illustrates an example of a structure of a code indicating items for service maintenance provided to the image forming apparatus according to a second exemplary embodiment.

FIG. 9 illustrates an example of a structure of a code indicating items for service maintenance provided to the image forming apparatus 110 according to the second exemplary embodiment. As illustrated in FIG. 9, in the second exemplary embodiment, OPTION FLAG (91) indicating the type of option and OPTION DATA (92) are added to the code. If a coping method of a case required to be adjusted, to which the code corresponds, is effective only in a specific model, a problem may occur when the code is used in an unrelated model. Therefore, in the present exemplary embodiment, a model code may be included as the option to prevent the method from being misused in a model other than the target model.

For example, if OPTION FLAG (91) is "00", OPTION DATA (92) indicates a model code (model information) of the image forming apparatus 110. If OPTION FLAG (91) is "01", OPTION DATA (92) indicates the serial number of the image forming apparatus 110. If OPTION FLAG (91) is "10", OPTION DATA (92) indicates date-and-time information about an expiration date of the code.

Operations to be performed since a code is input until a screen is displayed according to the present exemplary embodiment will be described below with reference to a flowchart illustrated in FIG. 10. A case where OPTION FLAG (91) is "00", i.e., OPTION DATA (92) indicates a model code, will be described below.

FIG. 10 is a flowchart illustrating an example of processing for an image forming apparatus 110 according to the second exemplary embodiment to display an item screen for a maintenance mode based on an input code. Each of the steps in the flowchart is implemented when the CPU 1 in the image forming apparatus 110 reads out and executes a program that is computer-readably recorded in the program ROM 3.

Steps S901 to S906 illustrated in FIG. 10 are the same as steps S601 to S606 illustrated in FIG. 6 in the first exemplary embodiment, and hence description thereof is not repeated. In step S907, the CPU 1 acquires OPTION FLAG (91) and OPTION DATA (92) from the code that has been acquired in step S901. Then in step S908, the CPU 1 determines whether an option is effective. If OPTION FLAG (91) is "00", a value of OPTION DATA (92) indicates a model code of the image forming apparatus 110. Therefore, the CPU 1 determines whether the option is effective depending on whether the value of OPTION DATA (92) matches the model code of the image forming apparatus 110. The model code (the model information) of the image forming apparatus 110 is stored in a model information storage unit (a storage area in the program ROM 3).

If the value of OPTION DATA (92) does not match the model code of the image forming apparatus 110, the CPU 1 determines that the option is not effective (i.e., the acquired code is not effective) (NO in step S908), and the processing proceeds to step S910. In step S910, the CPU 1 displays an error information on the display unit 20 in the operation unit 9, and the processing proceeds to step S901. In step S901, the CPU 1 performs control to wait until a code is input.

On the other hand, if the value of OPTION DATA (92) matches the model code of the image forming apparatus 110, the CPU 1 determines that the option is effective (i.e., the acquired code is effective) (YES in step S908), and the processing proceeds to step S909.

In step S909, the CPU 1 performs control to display each of the items, which have been extracted from a code table in step S905, on the screen 50. The CPU 1 then performs control to accept setting of an adjustment value for each of the displayed items on the screen 50.

Control performed when OPTION FLAG (91) is "01" or "10", i.e., when the type of option is a serial number of the image forming apparatus 110 or date-and-time information about an expiration date of the code is similar to that when the type of option is the model code.

More specifically, if a serial number included in the code, which has been input in step S901, and the serial number of the image forming apparatus 110 do not match each other, for example, the CPU 1 determines that the option is ineffective (i.e., the acquired code is ineffective) (NO in step S908), and the processing proceeds to step S910. The serial number of the image forming apparatus 110 is stored in a serial number storage unit (the storage area in the program ROM 3).

If the expiration date included in the code, which has been input in step S901, exceeds the date at the time point where the code has been input, the option is ineffective (i.e., the acquired code is ineffective) (NO in step S908), and the processing proceeds to step S910.

As described above, it can be checked whether the input code is ineffective by including, in the code, information (OPTION FLAG (91) and OPTION DATA (92)) such as the type and serial number of the image forming apparatus to which the code corresponds, and an expiration date of the code. In the above-described exemplary embodiments, a configuration in which a code is input from a numeric keypad of the control key 21 and a soft keyboard displayed on the display unit 20 has been described. However, the configuration in which a code is input is not limited to this. For example, information (e.g., a barcode) placed in a service manual or a website may be read out by the scanning unit 11, to extract a code.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-019897 filed Feb. 1, 2012, which is hereby incorporated by reference herein in its entirety.

What is claimed is:

1. An image forming apparatus configured to display a maintenance item for a user to do maintenance, the image forming apparatus comprising:
    an input unit configured to input code information for specifying a plurality of maintenance items to be displayed by the image forming apparatus;
    a specifying unit configured to specify the plurality of maintenance items to be displayed by the image forming apparatus out of all the maintenance items based on the code information input by the input unit;
    a generation unit configured to generate a maintenance screen for displaying the plurality of maintenance items specified by the specifying unit on the same screen;
    a determination unit configured to determine whether the code information input by the input unit is effective; and
    a display unit configured to display the maintenance screen generated by the generation unit when the determination unit determines that the code information is effective,
    wherein the displaying unit displays error information indicating that the code information is not effective when the determination unit determines that the code information is not effective.

2. The image forming apparatus according to claim 1, wherein input of an adjustment value is accepted for the plurality of maintenance items on the maintenance screen displayed by the display unit.

3. The image forming apparatus according to claim 2, wherein the display unit further displays an instruction unit configured to set the input adjustment value for the plurality of maintenance items to the image forming apparatus, and
    wherein the input adjustment value for the plurality of maintenance items is set to the image forming apparatus in response to the user selecting the instruction unit.

4. The image forming apparatus according to claim 1, further comprising a storage unit configured to store a code number indicating the specific maintenance item for all the maintenance items,
    wherein the code information input by the input unit indicates a plurality of code numbers, and
    wherein the specifying unit specifies the plurality of maintenance items indicated by the plurality of code numbers.

5. The image forming apparatus according to claim 1, wherein the code information includes checksum information, and
    wherein the determination unit determines whether the code information input by the input unit is effective based on the checksum information.

6. The image forming apparatus according to claim 1, wherein the code information includes model information indicating a model corresponding to the code information, and
    wherein the determination unit determines whether the code information input by the input unit is effective based on the model information.

7. The image forming apparatus according to claim 1, wherein the code information includes information indicating an expiration date of the code information, and
    wherein the determination unit determines whether the code information input by the input unit is effective based on the information indicating the expiration date.

8. A method for controlling an image forming apparatus configured to display a maintenance item for a user to do maintenance, the method comprising:
    inputting code information for specifying a plurality of maintenance items to be displayed by the image forming apparatus;
    specifying the plurality of maintenance items to be displayed by the image forming apparatus out of all the maintenance items based on the input code information;
    generating a maintenance screen for displaying the specified plurality of maintenance items on the same screen;
    determining whether the code information input by the inputting step is effective; and
    displaying the generated maintenance screen and error information when the determining step determines that the code information is effective,
    wherein the displaying step displays error information indicating that the code information is not effective when the determining step determines that the code information is not effective.

9. A non-transitory computer-readable storage medium storing a program that causes a computer to perform the method according to claim 8.

* * * * *